J. V. ROBINSON.
PIPE COUPLING.
APPLICATION FILED MAY 8, 1913.

1,216,609. Patented Feb. 20, 1917.

Witnesses
L. A. Brooke
H. McSpangler

Inventor
Jos V. Robinson
By J. M. Watson
Attorney

THE NORRIS PETERS CO., PHOTO LITHO., WASHINGTON, D. C.

UNITED STATES PATENT OFFICE.

JOSEPH V. ROBINSON, OF CHEVY CHASE, MARYLAND.

PIPE-COUPLING.

1,216,609. Specification of Letters Patent. Patented Feb. 20, 1917.

Application filed May 8, 1913. Serial No. 766,417.

*To all whom it may concern:*

Be it known that I, JOSEPH V. ROBINSON, a citizen of the United States, residing at Chevy Chase, Maryland, have invented certain new and useful Improvements in Pipe-Couplings, of which the following is a specification.

The object of the present invention is to increase the efficiency and utility and cheapen the cost of production of pipe couplings; to provide an improved pipe coupling in which the pressure of the fluid in the pipes is utilized to tightly hold the packing of the coupling in contact and automatically take up the wear thereon, and to produce a coupling of this description in which the coupling members have free rotary and axial movement in the coupled position relative to each other.

In the accompanying drawings forming a part of this specification and in which similar reference symbols represent corresponding parts in the several views.

Figure 3:
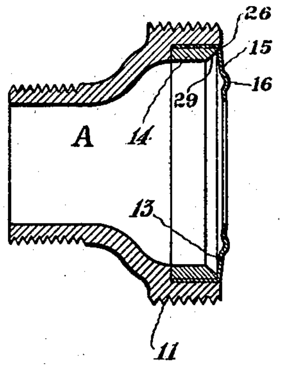
Fig. 3, is a longitudinal section of the coupling member A showing the resilient metallic gasket in position.
Figure 4:
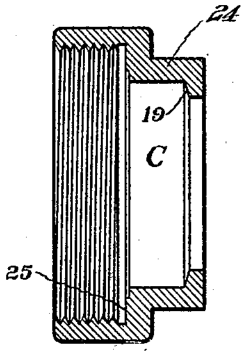
Fig. 4, is a longitudinal section of the clamp or nut C.
Figure 5:
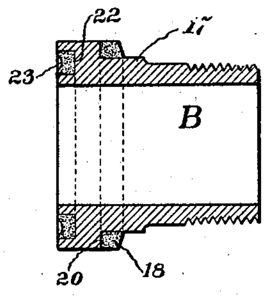
Fig. 5, is a longitudinal section of the coupling member B, showing the packing rings in position thereon.

Referring more especially to the drawings:

A and B designate the coupling members each of which is threaded at 10 to receive the sections of pipe or other parts to be coupled and have relative axial and rotary or swivel movement in the coupled position. The member A is provided with an enlarged externally threaded end or head 11, recessed at 12 to receive a cup shaped resilient metallic gasket 13. The gasket is pressed into the recess after being forced over a steel ring 14 to give rigidity to its side walls, and to insure a tight connection between it and the coupling member A. The face 15 of the gasket extends in advance of the face of the aforesaid coupling member and is slightly dished, as shown in Fig. 3.

The coupling member B is provided with a raised seat 17 extending around its exterior, on which seat an anti-friction lubricating packing 18, preferably of a composition of graphite and metal, is mounted. The packing is provided with a tapered face for fitting closely with a correspondingly shaped portion 19 of the nut or clamp C, as shown. This packing abuts a shoulder 20 of the coupling member B and is put under compression when the parts are assembled. A somewhat similar packing 21, preferably composed of the same materials, is pressed into the recess 22 of the face of the coupling member B and is provided with a groove 23 corresponding in outline with the head of the gasket 13 with which it mates.

Figure 1:
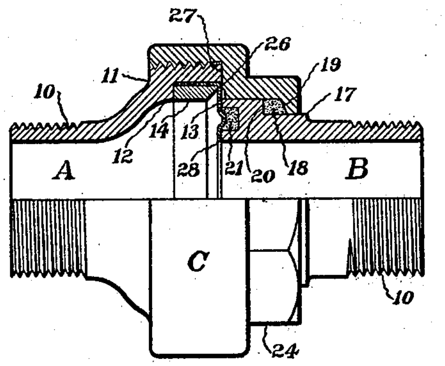
Figure 1, is a side view of the coupling, partly in elevation and partly in section.
Figure 2:
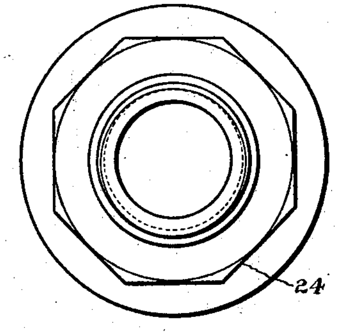
Fig. 2, is an end view of Fig. 1.

As shown, especially in Fig. 1, a ring or clamping nut C, is provided for clamping the coupling members together. This nut comprises an angular shank 24 which fits closely over the member B and acts against the packing 18 in drawing the parts together.

The inner face 25 of the nut C lightly engages, as at 26, the face of the gasket 13, so as to hold and press the latter into the recess 12 of the coupling member A. The nut is preferably made of a non-corrodible metal to prevent rust and corrosion between it and the member B, in order to avoid liability of interference with the free swiveling of the latter in the nut. The nut tightly engages the face of the coupling member A at 27 to prevent the escape of a fluid thereat, and is internally threaded, as shown, to mate with the threaded portion of the member A.

In operation the coupling is assembled in the usual manner. As the nut C is screwed home, the members A and B are drawn toward each other, bringing the packing 21 into tight engagement with the bead 16 of the gasket and pressing back the face of the latter until it lies substantially in the plane of the face of the coupling member A. The tendency of the gasket to resume its normal position (shown in Fig. 3), holds it in tight engagement with the packing 21 and maintains the packing 18 under pressure between the nut C and the coupling member B, effecting an air tight joint at that point also. The spring action of the gasket in both of these respects is greatly augmented by the pressure of the fluid in the coupling, the recess 12 being sufficient in diameter to expose substantially the full face of the gasket to the pressure of the fluid in the members. The force of such pressure along the inner face of the gasket is several times the pressure tending to escape at 28, under which the gasket may be said to have a piston action which automatically takes up any wear on the parts and maintains a perfectly tight joint at the packing 18 and 21 at all times.

Figure 6:
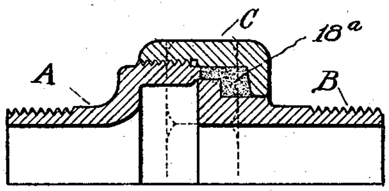
Fig. 6 is a sectional view showing a modified form of the coupling.

The ring 14 is beveled at 29 to expose as nearly as possible the full area of the face of the gasket, the inside diameter of which, at 28, is a little greater than the inside diameter of the coupling member B, to insure an unobstructed flow of the fluid through the latter. Although I have shown the coupling as it would be used as a union in the plumbing and steam fitting trades, I have designed it with particular attention to the requirements of connecting flexible metallic pipes to take the place of rubber hose for conveying air and steam from one railway car to another. In adapting it for this service I am aware that the coupling members A and B will, in some instances, have to be made in the form of elbows, or pipe sections and that when used in either of these services, the packing 18 may be extended over the shoulder 20 of the coupling B into engagement with the gasket 13 at 26 or the coupling member A at 27, and put under pressure to minimize the wear on the shoulder 20 of the coupling member B and increase the tightness of the joint. In Fig. 6 I have shown the packing $18^a$ arranged as indicated above.

What I claim as new and desire to secure by Letters Patent is:

1. A pipe coupling, comprising two detachably connected coupling members, each of said members having an annular recess in its end contiguous to the other coupling member, and a metallic gasket having a cylindrical portion secured in one of said recesses, and an annular bead opposite the other recess.

2. A pipe coupling, comprising two detachably connected coupling members, each of said members having an annular recess in its end contiguous to the other coupling member, and a metallic gasket having a cylindrical portion secured in one of said recesses, and an annular bead opposite the other recess, said latter recess having a packing adapted to form a seat for said bead.

3. A pipe coupling comprising two coupling members, a clamping ring having threaded engagement with one of said members, an annular lubricating packing between said ring and the other member, a flexible metallic gasket securely connected to one of said members and having an annular portion seated against the other member, said packing and gasket permitting one member to turn relatively to the other while maintaining a tight joint between the members.

4. A pipe coupling comprising two coupling members, a clamping ring having threaded engagement with one of said members, an annular lubricating packing between said ring and the other member, a flexible metallic gasket securely connected to one of said members and having an annular portion, that overlaps the end of the other member, the latter having an annular packing seated in its end against which said gasket seats, said coupling members being free to turn relatively and said flexible gasket being normally pressed against the packing in the opposing member by the fluid within the coupling.

5. In a pipe coupling a hollow coupling member having an enlarged end provided with an annular internal recess, in combination with an annular sheet metal gasket having a cylindrical portion and a face portion, the opening in the latter being of less diameter than the cylindrical portion, the cylindrical portion of said gasket being seated in said recess, and a clamping ring seated in said recess within said cylindrical portion.

6. A pipe coupling comprising two coupling members, and means for connecting them together, one of said coupling members having an enlarged end and the other coupling member being of substantially uniform internal diameter, a thin metal gasket having a cylindrical flange seated in the enlarged end of the one coupling member and having a face portion extending transversely of and bearing against the end of the other coupling member.

7. A pipe coupling comprising two coupling members, and means for connecting them together, one of said coupling members having an enlarged end and the other coupling member being of substantially uniform internal diameter, a thin metal gasket having a cylindrical flange seated in the enlarged end of the one coupling member and having a face portion bearing against the end of the other coupling member, said gasket having an annular bead and said latter coupling member having an annular packing in its end against which said bead seats, for the purpose set forth.

In testimony whereof I affix my signature in presence of two witnesses.

JOSEPH V. ROBINSON.

Witnesses:
M. C. Sheridan,
J. L. Henning.

Copies of this patent may be obtained for five cents each, by addressing the "Commissioner of Patents, Washington, D. C."